UNITED STATES PATENT OFFICE.

LOUIS M. DENNIS, OF ITHACA, NEW YORK.

METHOD OF SEPARATING A SULFONIC ACID OF A HYDROCARBON OF THE AROMATIC SERIES FROM SULFURIC ACID AND OF CONVERTING THE SULFONIC ACID INTO A SALT.

1,211,923. Specification of Letters Patent. Patented Jan. 9, 1917.

No Drawing. Application filed July 14, 1916. Serial No. 109,213.

*To all whom it may concern:*

Be it known that I, LOUIS M. DENNIS, a citizen of the United States of America, residing at Ithaca, Tompkins county, New York, have invented certain new and useful improvements in methods of separating a sulfonic acid of a hydrocarbon of the aromatic series from sulfuric acid and of converting the sulfonic acid into a salt by treatment with a suitable base or compound, of which the following is a specification.

My invention relates to methods of separating a sulfonic acid of a hydrocarbon of the aromatic series from sulfuric acid and the converting of the sulfonic acid into a salt of the same by treatment with a suitable base or compound.

I shall illustrate my invention by describing the making of a naphthalene sulfonic acid and converting the same into a salt, for example, sodium naphthalene sulfonate by treatment with a suitable sodium compound such as sodium hydroxid, although the invention is not restricted either to the making of such sulfonic acid or to the making of any particular salt thereof. In my application Serial No. 67,535, filed December 18, 1915, and in an application filed contemporaneously herewith under Serial No. 109214, I have described and claimed my invention in connection with other specific sulfonic acids than the one described and claimed herein.

In carrying out my process, I prepare a naphthalene sulfonic acid by treating the naphthalene with sulfuric acid or fuming sulfuric acid, preferably concentrated sulfuric acid, to produce the naphthalene sulfonic acid in the presence of an excess of sulfuric acid. I treat the mixture of naphthalene sulfonic acid and sulfuric acid thus formed by the action of sulfuric acid upon the naphthalene, with a solvent having the property of dissolving the naphthalene sulfonic acid but of not dissolving any appreciable amount of the sulfuric acid. I have found benzene suitable for the purpose. The solution of the naphthalene sulfonic acid is then separated from the residual sulfuric acid and brought into contact with water which dissolves out the naphthalene sulfonic acid. The solvent, such as benzene, separates from this in a distinct layer and is thus set free to be used again in the extraction of further portions of naphthalene sulfonic acid from a mixture of the same with sulfuric acid. Or, instead of bringing the solution of the naphthalene sulfonic acid into contact with water, it may be brought into contact with a suitable base or compound, such as an aqueous solution of sodium carbonate, sodium bi-carbonate, sodium sulfite or preferably sodium hydroxid, whereupon the sodium salt of the naphthalene sulfonic acid separates out in solid form, being relatively insoluble in benzene for example, and is separated from the benzene by any suitable means, such as filtration, evaporation, or both. As before, the solvent thus set free may be used again in the extraction of further portions of naphthalene sulfonic acid from a fresh mixture of the same with sulfuric acid. The sulfuric acid which remains after the naphthalene sulfonic acid has been removed from it by the solvent is drawn off and used for any desired purpose.

It is obvious that other solvents than benzene may be used to dissolve the naphthalene sulfonic acid, that other salts than the sodium salt of said acid may be produced by the use of suitable bases or other compounds and that the method is applicable to sulfonic acids of other hydrocarbons of the aromatic series besides the napthalenes. Where I use the term "base" or "compound" in the specification or claims, I mean to include mixtures of suitable bases or compounds or mixtures of suitable bases and compounds, as well, and where I use the term "insoluble" I use it in its relative sense meaning that there is no appreciable solubility; and where I refer to benzene or other solvents as "not dissolving" sulfuric acid, I mean not dissolving any appreciable amount.

I claim:

1. A method of separating a sulfonic acid of a hydrocarbon of the aromatic series from sulfuric acid consisting in treating a mixture of the acids with a solvent which dissolves but one of them.

2. A method of separating a sulfonic acid of a hydrocarbon of the aromatic series from sulfuric acid consisting in treating a mixture of the acids with a solvent which dissolves the sulfonic acid but not the sulfuric acid.

3. A method of separating a sulfonic acid of a hydrocarbon of the aromatic series from sulfuric acid consisting in treating a mixture of the acids with an organic solvent which dissolves the sulfonic acid but not the sulfuric acid.

4. A method of separating a sulfonic acid of a hydrocarbon of the aromatic series from sulfuric acid consisting in treating a mixture of the acids with benzene.

5. A method of making a salt of a sulfonic acid of a hydrocarbon of the aromatic series consisting in dissolving the sulfonic acid in a solvent in which the salt is relatively insoluble and treating the solution with a suitable compound to form the salt.

6. A method of making a salt of a sulfonic acid of a hydrocarbon of the aromatic series consisting in dissolving the sulfonic acid in an organic solvent in which the salt is relatively insoluble and treating the solution with a suitable compound to form the salt.

7. A method of making a salt of a sulfonic acid of a hydrocarbon of the aromatic series consisting in dissolving the sulfonic acid in benzene and treating the solution with a suitable compound to form the salt.

8. A method of making the sodium salt of a sulfonic acid of a hydrocarbon of the aromatic series consisting in dissolving the sulfonic acid in benzene and treating the solution with an aqueous solution of a suitable sodium compound.

9. A method of making the sodium salt of a sulfonic acid of a hydrocarbon of the aromatic series consisting in dissolving the sulfonic acid in benzene and treating the solution with an aqueous solution of sodium hydroxid.

10. A method of making a salt of a sulfonic acid of a hydrocarbon of the aromatic series consisting in dissolving the sulfonic acid in a solvent in which the salt is relatively insoluble, treating the solution with an aqueous solvent to dissolve and retain the sulfonic acid and with a substance which will convert the acid into a salt.

11. A method of making a salt of a sulfonic acid of a hydrocarbon of the aromatic series consisting in dissolving the sulfonic acid in an organic solvent in which the salt is relatively insoluble, treating the solution with an aqueous solvent to dissolve and retain the sulfonic acid and with a substance which will convert the acid into a salt.

12. A method of making a salt of a sulfonic acid of a hydrocarbon of the aromatic series consisting in dissolving the sulfonic acid in benzene, treating the solution with an aqueous solvent to dissolve and retain the sulfonic acid and with a substance which will convert the acid into a salt.

13. A method of making the sodium salt of a sulfonic acid of a hydrocarbon of the aromatic series consisting in dissolving the sulfonic acid in benzene, treating the solution with an aqueous solvent to dissolve and retain the sulfonic acid and with a suitable sodium compound which will convert the acid into a salt.

14. A method of making the sodium salt of a sulfonic acid of a hydrocarbon of the aromatic series consisting in dissolving the sulfonic acid in benzene, treating the solution with an aqueous solvent to dissolve and retain the sulfonic acid and with sodium hydroxid to convert the acid into a salt.

15. A method of separating a sulfonic acid of a hydrocarbon of the aromatic series from sulfuric acid and converting the sulfonic acid into a salt of the acid consisting in treating a mixture of the acids with a solvent which dissolves the sulfonic acid but not the sulfuric acid, separating the solution of sulfonic acid from the sulfuric acid and treating the solution with a suitable compound to form a salt relatively insoluble in the original solvent.

16. A method of separating a sulfonic acid of a hydrocarbon of the aromatic series from sulfuric acid and converting the sulfonic acid into a salt of the acid consisting in treating a mixture of the acids with benzene, separating the benzene solution of sulfonic acid from the sulfuric acid and treating the solution with a suitable compound to form a salt relatively insoluble in benzene.

17. A method of separating a sulfonic acid of a hydrocarbon of the aromatic series from sulfuric acid and converting the sulfonic acid into the sodium salt of the acid consisting in treating a mixture of the acids with benzene, separating the benzene solution of sulfonic acid from the sulfuric acid and treating the solution with an aqueous solution of a suitable sodium compound.

18. A method of separating a sulfonic acid of a hydrocarbon of the aromatic series from sulfuric acid and converting the sulfonic acid into the sodium salt of the acid consisting in treating a mixture of the acids with benzene, separating the benzene solution of sulfonic acid from the sulfuric acid and treating the solution with an aqueous solution of sodium hydroxid.

19. A method of separating a sulfonic acid of a hydrocarbon of the aromatic series from sulfuric acid and converting the sulfonic acid into a salt of the acid consisting in treating a mixture of the acids with benzene, separating the benzene solution of sulfonic acid from the sulfuric acid, treating the solution with a suitable compound to form a salt relatively insoluble in benzene, drawing off the benzene substantially freed from the salt of the sulfonic acid and returning the same to a fresh portion of the mixed acids.

20. A method of separating a sulfonic acid of a hydrocarbon of the aromatic series from sulfuric acid consisting in treating a mixture of the acids with benzene, separating the benzene solution of sulfonic acid from the sulfuric acid, substantially freeing the benzene from the sulfonic acid and returning the benzene to a fresh portion of the mixed acids.

21. A method of separating a sulfonic acid of a hydrocarbon of the aromatic series from sulfuric acid consisting in treating a mixture of the acids with benzene, separating the benzene solution of sulfonic acid from the sulfuric acid, substantially freeing the benzene from the sulfonic acid by treating the same with an aqueous solvent to dissolve and retain the sulfonic acid and returning the benzene to a fresh portion of the mixed acids.

22. A method of making a salt of a sulfonic acid of a hydrocarbon of the aromatic series consisting in treating a mixture of the sulfonic acid and sulfuric acid with benzene, separating the benzene solution of sulfonic acid from the sulfuric acid, substantially freeing the benzene from the sulfonic acid by treating the solution with an aqueous solvent to dissolve and retain the sulfonic acid and with a substance which will convert the acid into a salt.

23. A method of separating a naphthalene sulfonic acid from sulfuric acid consisting in treating a mixture of the acids with a solvent which dissolves but one of them.

24. A method of separating a naphthalene sulfonic acid from sulfuric acid consisting in treating a mixture of the acids with a solvent which dissolves the sulfonic acid but not the sulfuric acid.

25. A method of separating a naphthalene sulfonic acid from sulfuric acid consisting in treating a mixture of the acids with an organic solvent which dissolves the sulfonic acid but not the sulfuric acid.

26. A method of separating a naphthalene sulfonic acid from sulfuric acid consisting in treating a mixture of the acids with benzene.

27. A method of making a salt of a naphthalene sulfonic acid consisting in dissolving the sulfonic acid in a solvent in which the salt is relatively insoluble and treating the solution with a suitable compound to form the salt.

28. A method of making a salt of a naphthalene sulfonic acid consisting in dissolving the sulfonic acid in an organic solvent in which the salt is relatively insoluble and treating the solution with a suitable compound to form the salt.

29. A method of making a salt of a naphthalene sulfonic acid consisting in dissolving the sulfonic acid in benzene and treating the solution with a suitable compound to form the salt.

30. A method of making a sodium naphthalene sulfonate consisting in dissolving naphthalene sulfonic acid in benzene and treating the solution with an aqueous solution of a suitable sodium compound.

31. A method of making a sodium naphthalene sulfonate consisting in dissolving naphthalene sulfonic acid in benzene and treating the solution with an aqueous solution of sodium hydroxid.

32. A method of making a salt of a naphthalene sulfonic acid consisting in dissolving the sulfonic acid in a solvent in which the salt is relatively insoluble, treating the solution with an aqueous solvent to dissolve and retain the sulfonic acid and with a substance which will convert the acid into a salt.

33. A method of making a salt of a naphthalene sulfonic acid consisting in dissolving the sulfonic acid in an organic solvent in which the salt is relatively insoluble, treating the solution with an aqueous solvent to dissolve and retain the sulfonic acid and with a substance which will convert the acid into a salt.

34. A method of making a salt of a naphthalene sulfonic acid consisting in dissolving the sulfonic acid in benzene, treating the solution with an aqueous solvent to dissolve and retain the sulfonic acid and with a substance which will convert the acid into a salt.

35. A method of making a sodium naphthalene sulfonate consisting in dissolving naphthalene sulfonic acid in benzene, treating the solution with an aqueous solvent to dissolve and retain the sulfonic acid and with a suitable sodium compound which will convert the acid into a salt.

36. A method of making a sodium naphthalene sulfonate consisting in dissolving naphthalene sulfonic acid in benzene, treating the solution with an aqueous solvent to dissolve and retain the sulfonic acid and with sodium hydroxid to convert the acid into a salt.

37. A method of separating a naphthalene sulfonic acid from sulfuric acid and converting the sulfonic acid into a salt of the acid consisting in treating a mixture of the acids with a solvent which dissolves the sulfonic acid but not the sulfuric acid, separating the solution of sulfonic acid from the sulfuric acid and treating the solution with a suitable compound to form a salt relatively insoluble in the original solvent.

38. A method of separating a naphthalene sulfonic acid from sulfuric acid and converting the sulfonic acid into a salt of the acid consisting in treating a mixture of the acids with benzene, separating the benzene solution of the sulfonic acid from the sulfuric acid and treating the solution with a suitable compound to form a salt relatively insoluble in benzene.

39. A method of separating a naphthalene sulfonic acid from sulfuric acid and converting the acid into a sodium naphthalene sulfonate consisting in treating a mixture of the acids with benzene, separating the benzene solution of the sulfonic acid from the sulfuric acid and treating the solution with an aqueous solution of a suitable sodium compound.

40. A method of separating a naphthalene sulfonic acid from sulfuric acid and converting the acid into a sodium naphthalene sulfonate consisting in treating a mixture of the acids with benzene, separating the benzene solution of the sulfonic acid from the sulfuric acid and treating the solution with an aqueous solution of sodium hydroxid.

41. A method of separating a naphthalene sulfonic acid from sulfuric acid and converting the sulfonic acid into a salt of the acid consisting in treating a mixture of the acids with benzene, separating the benzene solution of the sulfonic acid from the sulfuric acid, treating the solution with a suitable compound to form a salt relatively insoluble in benzene, drawing off the benzene freed from the salt of the sulfonic acid and returning the same to a fresh portion of the mixed acids.

42. A method of separating a naphthalene sulfonic acid from sulfuric acid consisting in treating a mixture of the acids with benzene, separating the benzene solution of the sulfonic acid from the sulfuric acid, freeing the benzene from the sulfonic acid and returning the benzene to a fresh portion of the mixed acids.

43. A method of separating a naphthalene sulfonic acid from sulfuric acid consisting in treating a mixture of the acids with benzene, separating the benzene solution of the sulfonic acid from the sulfuric acid, freeing the benzene from the sulfonic acid by treating the solution with an aqueous solvent to dissolve and retain the sulfonic acid and returning the benzene to a fresh portion of the mixed acids.

44. A method of making a salt of a naphthalene sulfonic acid consisting in treating a mixture of the sulfonic acid and sulfuric acid with benzene, separating the benzene solution of the sulfonic acid from the sulfuric acid, freeing the benzene from the sulfonic acid by treating the solution with an aqueous solvent to dissolve and retain the sulfonic acid and with a substance which will convert the acid into a salt.

In testimony whereof I have signed this specification.

LOUIS M. DENNIS.